United States Patent
Colvin et al.

(10) Patent No.: US 9,336,379 B2
(45) Date of Patent: May 10, 2016

(54) REPUTATION-BASED SAFE ACCESS USER EXPERIENCE

(75) Inventors: Ryan C Colvin, Woodinville, WA (US); Ameya S. Bhatawdekar, Issaquah, WA (US); Elliot J (Jeb) Haber, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 12/859,679

(22) Filed: Aug. 19, 2010

(65) Prior Publication Data
US 2012/0047461 A1     Feb. 23, 2012

(51) Int. Cl.
| | |
|---|---|
| *G06F 3/00* | (2006.01) |
| *G06F 21/50* | (2013.01) |
| *G06F 3/048* | (2013.01) |
| *G06F 3/0481* | (2013.01) |

(52) U.S. Cl.
CPC ............. *G06F 21/50* (2013.01); *G06F 3/048* (2013.01); *G06F 3/0481* (2013.01); *G06F 3/04812* (2013.01)

(58) Field of Classification Search
CPC .... G06F 3/048; G06F 3/0481; G06F 3/04812
USPC .................................... 726/23; 715/741–746
See application file for complete search history.

(56) References Cited

U.S. PATENT DOCUMENTS

| | | | |
|---|---|---|---|
| 5,572,643 A | 11/1996 | Judson | |
| 6,182,129 B1 | 1/2001 | Rowe et al. | |
| 6,367,012 B1 | 4/2002 | Atkinson et al. | |
| 6,563,514 B1 | 5/2003 | Samar | |
| 6,571,256 B1 | 5/2003 | Dorian et al. | |
| 6,745,367 B1 | 6/2004 | Bates et al. | |
| 6,819,336 B1 | 11/2004 | Nielsen | |
| 6,892,178 B1 | 5/2005 | Zacharia | |
| 7,003,522 B1 | 2/2006 | Reynar et al. | |
| 7,107,530 B2 | 9/2006 | Blakely et al. | |
| 7,539,776 B1 | 5/2009 | Saare et al. | |
| 7,562,304 B2 * | 7/2009 | Dixon et al. | 715/738 |
| 7,580,982 B2 | 8/2009 | Owen et al. | |
| 7,797,421 B1 | 9/2010 | Scofield et al. | |
| 7,831,915 B2 | 11/2010 | Averbuch et al. | |
| 7,870,203 B2 | 1/2011 | Judge et al. | |
| 7,886,032 B1 | 2/2011 | Louz-On | |
| 7,930,289 B2 | 4/2011 | Cheshire | |

(Continued)

OTHER PUBLICATIONS

"InterScan Web Security Suite 3.1", retrieved on Jun. 30, 2010 at <<http://www.mcafee.com/us/local_content/solution_briefs/web_gateway_sb.pdf>>, Trend Micro, 2008, pp. 1-2.

(Continued)

*Primary Examiner* — Kieu Vu
*Assistant Examiner* — Andrew Chung
(74) *Attorney, Agent, or Firm* — Bryan Webster; Judy Yee; Micky Minhas

(57) ABSTRACT

Reputation-based resource lookup may include determining the reputation of resources that are to be accessed. Based on the reputation of the resource, a user experience is provided. Protection can be provided from known and suspicious resources, by providing warnings, such as unique graphical visual warnings and textual messages. Furthermore, additional information may be provided as to the desired resource. A user may be further required to go through several pages or asked various questions before accessing a resource.

19 Claims, 17 Drawing Sheets

(56) References Cited

U.S. PATENT DOCUMENTS

| | | | |
|---|---|---|---|
| 7,966,553 B2 | 6/2011 | Iverson | |
| 8,166,155 B1* | 4/2012 | Rachmeler et al. | 709/224 |
| 8,281,361 B1 | 10/2012 | Schepis et al. | |
| 8,434,149 B1* | 4/2013 | Satish et al. | 726/22 |
| 2002/0147779 A1 | 10/2002 | Bates et al. | |
| 2002/0169826 A1 | 11/2002 | Yano et al. | |
| 2003/0018585 A1 | 1/2003 | Butler et al. | |
| 2003/0028762 A1 | 2/2003 | Trilli et al. | |
| 2003/0097591 A1 | 5/2003 | Pham et al. | |
| 2003/0188019 A1 | 10/2003 | Wesley | |
| 2004/0122926 A1 | 6/2004 | Moore et al. | |
| 2004/0187079 A1* | 9/2004 | Yamada et al. | 715/517 |
| 2004/0210602 A1 | 10/2004 | Hillis et al. | |
| 2005/0050470 A1 | 3/2005 | Hudson et al. | |
| 2005/0240456 A1 | 10/2005 | Ward et al. | |
| 2005/0246761 A1* | 11/2005 | Ross et al. | 726/1 |
| 2005/0262026 A1 | 11/2005 | Watkins | |
| 2006/0004914 A1 | 1/2006 | Kelly et al. | |
| 2006/0015722 A1 | 1/2006 | Rowan et al. | |
| 2006/0095404 A1 | 5/2006 | Adelman et al. | |
| 2006/0200554 A1 | 9/2006 | Shen et al. | |
| 2006/0218403 A1 | 9/2006 | Sauve et al. | |
| 2006/0253580 A1 | 11/2006 | Dixon et al. | |
| 2006/0253581 A1 | 11/2006 | Dixon et al. | |
| 2006/0253582 A1 | 11/2006 | Dixon et al. | |
| 2006/0253583 A1 | 11/2006 | Dixon et al. | |
| 2006/0253584 A1 | 11/2006 | Dixon et al. | |
| 2007/0011603 A1 | 1/2007 | Makela | |
| 2007/0050716 A1 | 3/2007 | Leahy et al. | |
| 2007/0078699 A1 | 4/2007 | Scott et al. | |
| 2007/0118898 A1* | 5/2007 | Morgan et al. | 726/22 |
| 2007/0124414 A1 | 5/2007 | Bedingfield, Sr. et al. | |
| 2007/0136279 A1 | 6/2007 | Zhou et al. | |
| 2007/0136806 A1 | 6/2007 | Berman | |
| 2007/0162349 A1 | 7/2007 | Silver | |
| 2007/0168490 A1 | 7/2007 | Kent et al. | |
| 2007/0192855 A1 | 8/2007 | Hulten et al. | |
| 2007/0208613 A1* | 9/2007 | Backer | 705/10 |
| 2007/0250916 A1 | 10/2007 | Shull et al. | |
| 2008/0021958 A1 | 1/2008 | Foote | |
| 2008/0022384 A1* | 1/2008 | Yee et al. | 726/11 |
| 2008/0082662 A1 | 4/2008 | Dandliker et al. | |
| 2008/0086361 A1 | 4/2008 | Eliezerov | |
| 2008/0109306 A1 | 5/2008 | Maigret et al. | |
| 2008/0109473 A1 | 5/2008 | Dixon et al. | |
| 2008/0114709 A1 | 5/2008 | Dixon et al. | |
| 2008/0196099 A1 | 8/2008 | Shastri | |
| 2008/0243920 A1 | 10/2008 | Newman et al. | |
| 2008/0256187 A1 | 10/2008 | Kay | |
| 2008/0288278 A1 | 11/2008 | Buss | |
| 2008/0307044 A1 | 12/2008 | Musson | |
| 2009/0076994 A1 | 3/2009 | Ghosh et al. | |
| 2009/0204677 A1* | 8/2009 | Michaelis et al. | 709/206 |
| 2009/0282052 A1 | 11/2009 | Evans et al. | |
| 2009/0300012 A1 | 12/2009 | Levow et al. | |
| 2010/0042487 A1 | 2/2010 | Barazani | |
| 2010/0057895 A1 | 3/2010 | Huang | |
| 2010/0076890 A1 | 3/2010 | Low et al. | |
| 2010/0153404 A1 | 6/2010 | Ghosh et al. | |
| 2010/0174795 A1 | 7/2010 | Adelman et al. | |
| 2010/0223251 A1 | 9/2010 | Adelman et al. | |
| 2010/0235918 A1 | 9/2010 | Mizrahi et al. | |
| 2010/0268739 A1 | 10/2010 | Zalepa | |
| 2010/0332837 A1 | 12/2010 | Osterwalder | |
| 2011/0004693 A1* | 1/2011 | Rehfuss | 709/229 |
| 2011/0030058 A1 | 2/2011 | Ben-Itzhak et al. | |
| 2011/0087647 A1 | 4/2011 | Signorini et al. | |
| 2011/0126259 A1 | 5/2011 | Krishnamurthi et al. | |
| 2011/0126289 A1 | 5/2011 | Yue et al. | |
| 2011/0154227 A1 | 6/2011 | Kang | |
| 2011/0173683 A1 | 7/2011 | Roach | |
| 2011/0191849 A1* | 8/2011 | Jayaraman et al. | 726/23 |
| 2011/0225652 A1 | 9/2011 | Emigh et al. | |
| 2011/0258201 A1 | 10/2011 | Levow et al. | |
| 2012/0131636 A1 | 5/2012 | Ross et al. | |

OTHER PUBLICATIONS

Josang, et al., "A Survey of Trust and Reputation Systems for Online Service Provision", retrieved on Jun. 30, 2010 at <<http://citeseerx.ist.psu.edu/viewdoc/download?doi=10.1.1.60.1963&rep=rep1&type=pdf>>, Elsevier Science Publishers, Decision Support Systems, vol. 43, No. 2, Mar. 2007, pp. 618-644.

"Actipro SyntaxEditor—Windows Forms .NET Control", available at least as early as Feb. 22, 2007, at <<http://www.actiprosoftware.com/Products/DotNet/WindowsForms/SyntaxEditor/SmartTag>>, Actipro Software LLC, 1999-2007, pp. 1-2.

"Complete Tasks Quickly with Smart Tags in Office XP", available at least as early as Feb. 22, 2007, at <<http://office.microsoft.com/en-us/help/HA010347451033.aspx>>, Microsoft Corporation, 2007, pp. 1-11.

"Interfaces in Visual Studio 2005", available at least as early as Feb. 22, 2007, at <<http://safari.oreilly.com/0596102070/pnetcomp2-CHP-3-SECT-5>>, Safari Books Online, 2006, pp. 1-3.

Office Action for U.S. Appl. No. 12/637,673, mailed on Feb. 3, 2012, Ameya S. Bhatawdekar, "Reputation Based Redirection Service", 16 pgs.

Office action for U.S. Appl. No. 12/637,673, mailed on Sep. 28, 2012, Bhatawdekar et al., "Reputation Based Redirection Service", 18 pages.

Garuba, et al., "Preventing parameterized vulnerability in Web based applications", International Conference on Information Technology (ITNG'07), 2007, pp. 1-4.

Jain, et al., "Secure Group Browsing", Indian Institute of Technology Guwahati, India, 2003, pp. 1-9.

Office action for U.S. Appl. No., 12/637,673, mailed on Oct. 25, 2013, Bhatawdekar, et al., "Reputation Based Redirection Service", 26 pages.

Office action for U.S. Appl. No. 12/637,673, mailed on Apr. 23, 2014, Bhatawdekar et al., "Reputation Based Redirection Service", 20 pages.

Non-Final Office Action for U.S. Appl. No. 13/050,585, mailed on Jun. 19, 2014, Kristofer N. Iverson, "Accessible Content Reputation Lookup", 10 pages.

Final Office Action for U.S. Appl. No. 13/050,585, mailed on Oct. 6, 2014, Kristofer N. Iverson, "Accessible Content Reputation Lookup", 10 pages.

Office action for U.S. Appl. No. 13/050,585, mailed on Mar. 19, 2015, Iverson, "Accessible Content Reputation Lookup", 10 pages.

Office action for U.S. Appl. No. 13/050,585, mailed on Oct. 23, 2015, Iverson et al., "Accessible Content Reputation Lookup", 10 pages.

* cited by examiner

REPUTATION-BASED SAFE ACCESS USER EXPERIENCE

BACKGROUND

Users of the World Wide Web are able to access a multitude of resources through the Internet. The resources include websites, file sharing sites, download sites, etc., from which users have the ability to access, transfer or download content/files, and generally interact online.

A user may or may not intentionally access a resource. For example, a user may intentionally visit a website or webpage, by typing the website or webpage's universal resource locator or URL on a web browser. The user then can be transferred to the website or webpage. As an example of an unintentional access to a resource, a user may receive a "hyperlink" to a resource, such as a website or webpage. The hyperlink may be part of a file or an email message. The user may be asked to click on and activate the hyperlink, the act of which sends the user to a site or resource.

The user may or may not have previously visited a resource. In certain cases, the user knows the resource. Often times the user is visiting a new resource, such as a previously unknown website or webpage. Or the user may be downloading a file from a site that the user has not previously used or visited. Sometimes, what the user thinks is a known resource, actually may be a different resource.

Therefore, a user can be exposed to unsafe or malevolent resources that can be harmful, the user having little or no knowledge as to the "safety" of such resources. Current browsers can attempt to assist and protect users, by providing warnings, such as pop up user interface warnings advising a user that a resource may not be safe. Typically, such interfaces or warnings are not well informed, and may not provide enough contextual information for a user to make an informed decision. For example, such warnings may not have enough information to provide the extent of the danger of the resource, or the degree of safety of the resource. Furthermore, such warnings are typically provided whenever the browser or application has no information as to the resources. Users may know this to be the case, or users may be preconditioned to such warnings, and simply ignore the warnings and proceed to a harmful resource. Such warnings typically provide a readily available click through interface to allow the user to proceed to the resource.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide techniques for reputation lookup of resources and providing information through various user experiences depending on reputation of an intended resource to be accessed. In certain implementations, options are provided as to particular resources including navigating away from the resource and creating information regarding the resource.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 10 depicts an example of a user interface of a download manager block experience and click through.

DETAILED DESCRIPTION

Resource Reputation Lookup and User Experiences

The techniques described herein are generally directed towards techniques for resource reputation lookup, and providing particular user experiences based on reputation of the particular resource. Some implementations allow menu options that include avoiding malicious resources, learning more about threats, providing user feedback, avoiding the resource, and/or accessing the resource.

Reputation Resource Lookup Service

Figure 1:
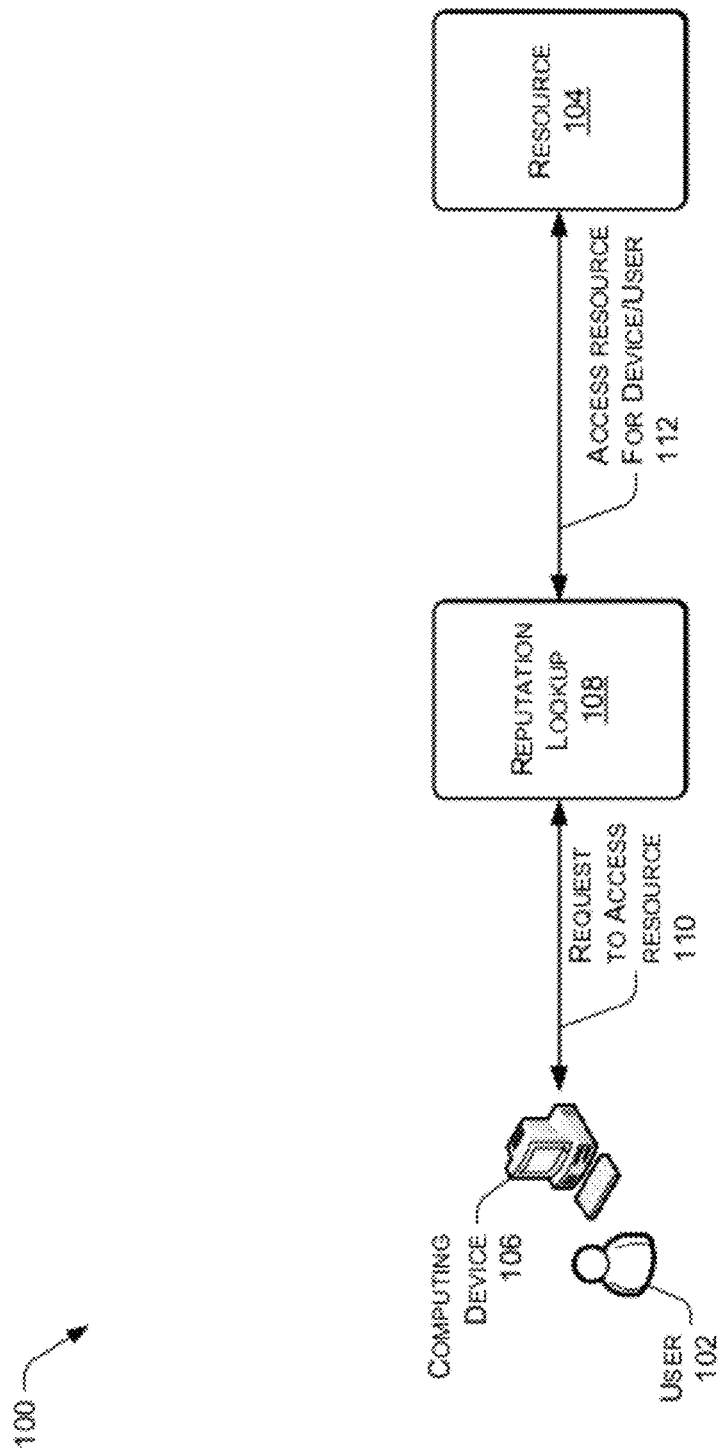
FIG. 1 is a block diagram of an example framework for requesting access to a resource through a reputation lookup service.

FIG. 1 illustrates a framework 100 for reputation lookup. A user 102 desires to access one or more resources, as represented by resource 104. Examples of resource 104 can include, and are not limited to, websites/webpages, digital media, documents, executable/non-executable files, and software plug-ins. Resources 104 can be part of the World Wide Web (i.e., www), and available through the Internet.

The user 102 uses a computing device 106 to access resource 104. Computing device 106 can include, and is not limited to, any computing device that implements applications, such as browsers, that allow the user to access a network, such as the Internet. Examples of computing device 106 include, but are not limited to, laptop computers, desktop computers, smart phones, wireless reader devices, and gaming consoles. Other examples of computing devices usable with the reputation lookup service described herein are described below.

In order to access the resource 104, computing device 106 goes through a reputation lookup service or reputation lookup 108. Reputation lookup 108 is further described in detail below. In general, reputation lookup 108 provides services to user 102 through computing device 106. In particular, the services can include reputation lookup 108 intervening and providing reputation information as to the resource 104 that the user 102 desires to access. Reputation lookup 108 can provide one of several user experiences, as further described below, to computing device 106 and user 102. Furthermore, reputation lookup 108 can provide access to the resource 104, as illustrated by "request to access resource" 110 between computing device 106 and reputation lookup 108, and "access resource for device/user" 112 between reputation lookup 108 and resource 104.

Figure 2:
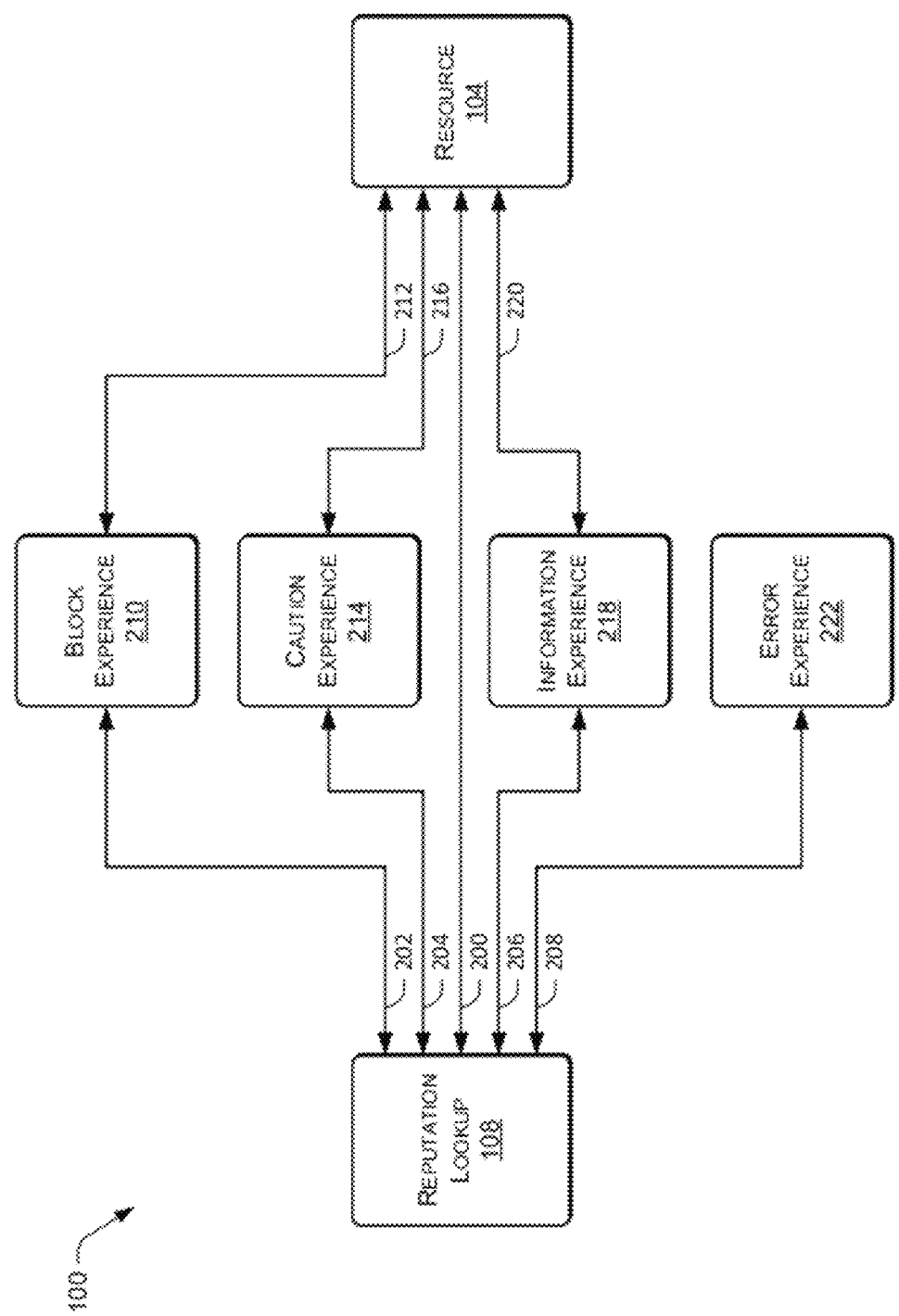
FIG. 2 is a block diagram of an example framework for a reputation lookup service which provides various user experiences in regards to a resource.

FIG. 2 illustrates the framework 100 with reputation lookup 108 providing various user experiences in regards to resource 104. Reputation lookup 108 maintains, or has the ability to access, records of reputations of various resources (e.g., resource 104). Through such records, reputation lookup 108 can determine which user experience to provide to the computing device 106 and user 102.

For example, reputation lookup 108 may determine that resource 104 is very unlikely to be malicious and can be considered as likely to be safe or is "known good" 200. Reputation lookup 108 can then provide direct access to the resource 104. In certain cases, reputation lookup 108 may determine that resource 104 is "known bad" as represented by 202. Reputation lookup 108 may determine that resource 104 is "suspicious" as represented by 204. Reputation lookup 108 may not have reputation information about resource 104, in which case resource 104 is determined as "unknown" as represented by 206. Reputation lookup 108 may determine that there is an "error," as represented by 208, with accessing resource 104. Therefore, example determinations can include, but are not limited to, "known good" 200, "known bad" 202", "suspicious" 204, "unknown" 206, and "error" 208.

A particular determination leads to a particular user experience. For example, as discussed above, a "known good" 200 leads to direct access to the resource 104. A "known bad" 202 determination leads to a block experience 210, which can lead to canceling the request or a "disregard request" or "disregard" action 212 that avoids the resource 104. The block experience 210 is further described below. A "suspicious" 204 determination leads to a caution experience 214, which can lead to a "continue" action 216 that provides access to the resource 104. The caution experience 214 is further described below. An "unknown" 206 determination leads to an information experience 218, which can lead to a "continue" action 220 that provides access to the resource 104. The information experience 218 is further described below. An "error" 208 determination leads to an error experience 222, which can provide information as to the error that is encountered. The error experience 222 is further described below.

User Behavior and Feedback

Figure 3:
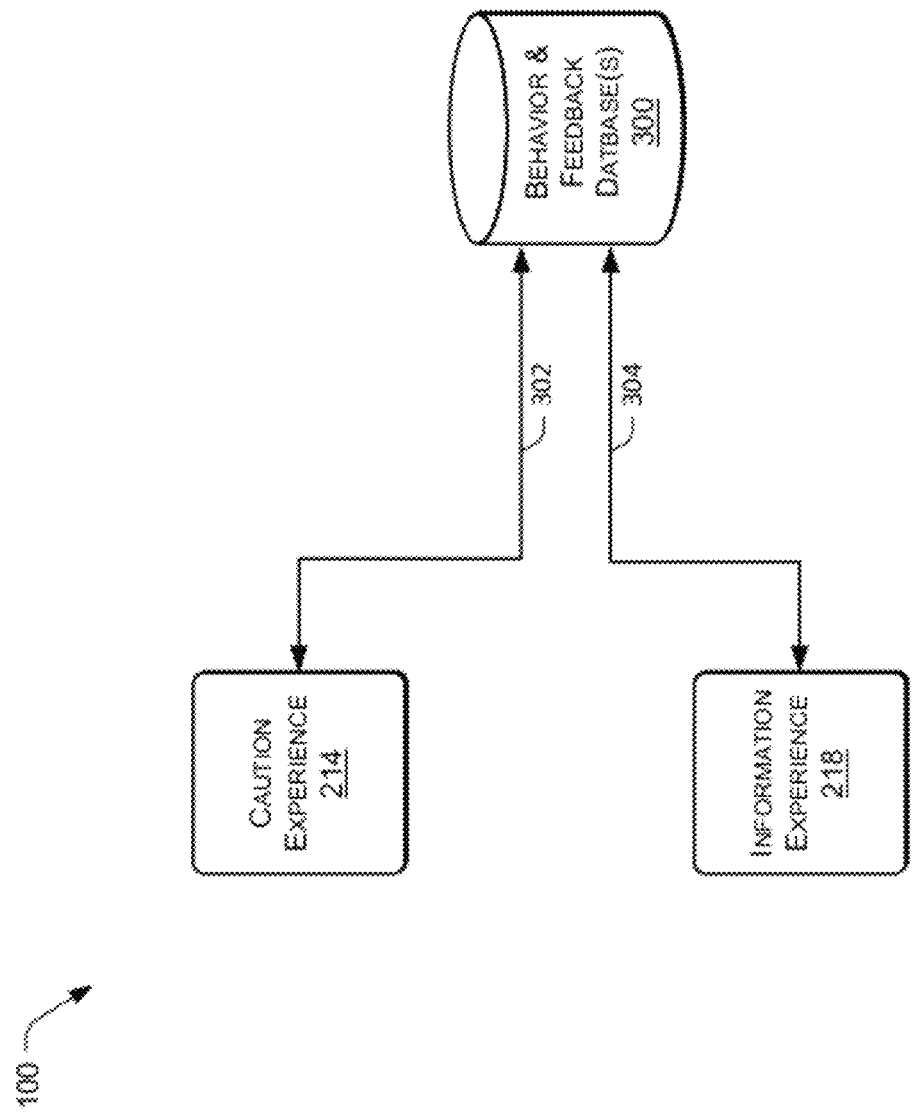
FIG. 3 is a block diagram of an example framework to provide behavior and feedback for user experience in regards to particular resources.

FIG. 3 illustrates the framework 100, and a provision for user behavior and feedback. In certain user experiences, for example the caution experience 214 and information experience 218, insufficient reputation data may be available as to a resource (e.g., resource 104). Therefore, user behavior and feedback can be gathered based on the actions of a user. Furthermore, user reporting can be implemented by gathering such feedback.

A behavior and feedback database(s) 300 can be used to gather such user behavior and feedback data as represented by 302 and 304. In this example, the data 302 and 304 are respectively received from the "caution experience" 214 and "information experience" 218. Other user experiences can also provide such behavior and feedback data.

User Behavior Telemetry

For user experiences, actions, such as user click throughs of clickable actions, can be initiated. The actions, such as the clickable actions, can be recorded in the various user experiences. The recorded data can be further processed, for example at a server computing device or devices. For example, the recorded data can be stored at behavior and feedback database(s) 300.

The data can include and indicate the number of users that disregard and continue through block experiences, continue through caution experiences, and how many users click on informational links. Such data can be used to evaluate the performance of the user experiences, and can be used in improving the user experiences. For example, using user behavior data, a determination can be made as to how to lower "click throughs" of users. Or in other words, the user behavior data can be used to determine whether changes can be made to an icon, text size, or text color around the option "Disregard and Continue" to prevent users from merely clicking through to potential malicious resources.

User behavior telemetry also can assist in evaluating the number of people continuing to resources having an unknown reliability, for example continuing from a particular information page. This user behavior data along with the user feedback described below, can provide necessary reliability data of previously unknown reliability resources. Therefore, a previously unknown reliability unknown resource can be dynamically changed to a known resource, with user behavior data which effectively tunes the user experience automatically.

Furthermore, such user behavior data can provide opportunities to tailor or create teachable user moments. For example, if it is determined that a user is getting a lot of block experience pages, an adjustment can be made to the block experience to provide more information about how the user(s) can protect themselves from running into risky places on the Internet.

User Feedback

On most of the user interfaces or pages described above, users can provide feedback. On a block experience user interface or page, feedback can be a report of a mistake (i.e., the resource is not "known bad"). On the caution experience and information experience user interfaces or pages, feedback can include reports about suspicious resources. Such reports can be fed to a backend system (e.g., database(s) 300) which is able to use the data to help generate reputation for unknown resources, or identify resources (e.g., sites) which are should have block experience, and when they should another user experience. User feedback combined with user behavior telemetry data, can help dynamically reclassify resources in a reputation service (i.e., reputation lookup 108) and can adjust the particular user experiences.

Block Experience

As discussed above, if the reputation lookup 108 determines that a particular resource (e.g., resource 104) is "known bad" 202, the reputation determination leads to block experience 210. The block experience 210 includes one of various user interfaces, which include messages and/or warnings that are provided from the reputation lookup 108 to the computing device 106.

Figure 4:
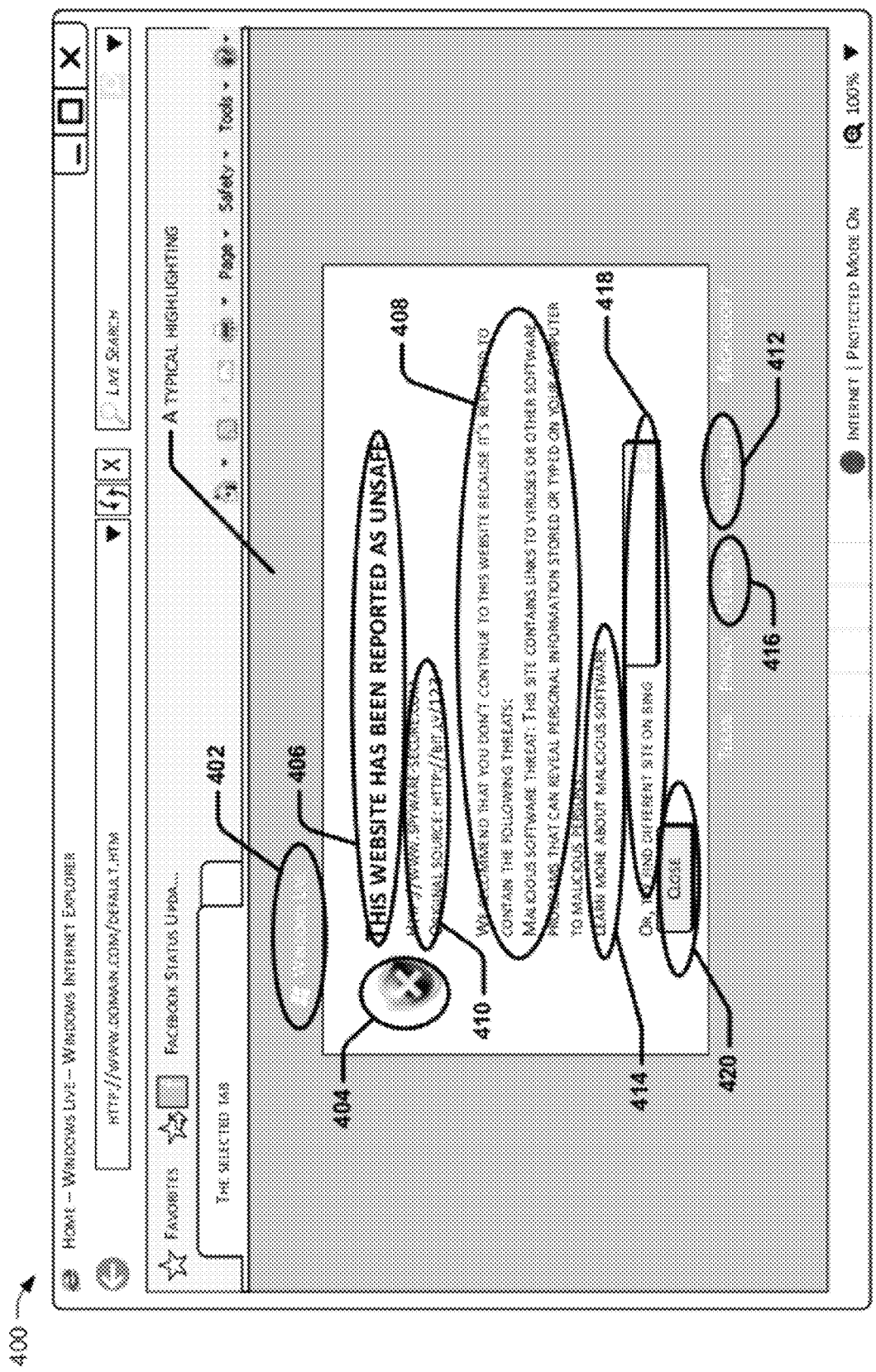
FIG. 4 depicts an example of a user interface of a block experience to a resource.

FIG. 4 is an example of a user interface 400 of a block experience to a resource. A block experience serves as a warning to the user that they may be attempting to access a known bad resource. Examples of a known bad resource include a phishing site, a malware link, or some other form of malicious resource (e.g., malicious advertising or malvertising).

The block experience can be presented in the form of a user interface, such as user interface 400. The user interface 400 can include messages and warnings such as the following.

The user interface 400 can provide a brand 402 that identifies a company, product, or technology brand. The brand 402 allows a common user interface to share common elements while mimicking the look and feel of multiple brands.

The user interface 400 can include consistent visual identifiers 404. Consistent visual identifiers 404 are a common set of visual identifiers (icons, graphics, effects) that increases the user's confidence that the user interface 400 is to a blocked phishing page, not a legitimate page to be ignored. The use of common or consistent icons indicates that the page should not be ignored.

A scary or warning message 406 can be displayed by user interface 400. The warning message 406 is an indication to the user that something unsafe is about to happen. The example warning message 406 in this illustration is "THIS WEBSTIE HAS BEEN REPORTED AS UNSAFE"; however, other warnings can be provided as well, such as "THIS IS AN UNSAFE WEBSITE", "THIS DOWNLOAD HAS BEEN REPORTED TO BE UNSAFE", etc. Contextual information 408 of the user interface 400 is added information that can accompany the scary or warning message 406. Example contextual information 408 messages, other than what is illustrated in FIG. 4 include "this site links to viruses", "this website is known to host Phishing", etc.

The user interface 400 can include resource identifier(s) 410. Resource identifiers 410 can include block content, such as particular URLs. Such URLs are not clickable or actionable, but are displayed for information purposes. The user may be instructed click on an icon, i.e., information links 412, in user interface 400 to get information links or "more information" or scroll to the bottom of the information to gain access to the block action. In certain implementations, the full URL is not shown, only the host URL. This can reduce the likelihood that the URL contains a trick. For example, "http://www.facebook.something.something.coolx.com" may lead a user to believe that this is a Facebook® site; however, user interface 400 would display only "coolx.com", making it clear to the user that this is the site that is blocked.

The user interface 400 can include contextual actions 414 providing information contextual data informing the user why an intended operation is bad or harmful. As discussed, information links can be provided by the user interface 400 that allow for general links for more information, such as "click here for more information about computer viruses", "more information about Phishing", etc. User feedback 416 may also be provided through the user interface 400. For example, the user feedback 416 allows the user to report that the block experience for the resource as a mistake. Feedback can be saved in a separate backend system for further evaluation (e.g., database 300).

The user interface 400 can include suggested actions 418. Suggest actions 418 can direct the user to perform a safer action, such as "go to a known good site", "go to a homepage", etc. The suggested actions 418, in this example, include the option for the user to enter search terms of what the user is looking for.

User interface 400 further can include navigation options 420. Navigation options 420 provide the user the ability to move to a succeeding or different user experience. An example of navigations options 420 is "close this window."

To further highlight or emphasis the block experience to the user, user interface 400 provides atypical highlighting 422. Atypical highlighting 422 means that the user interface 400 is designed to look different than other user experiences that a user may receive. For example, instead of a common white background with white background with black text, a red background with contrasting text can be implemented for atypical highlighting 422. This indicates to the user that something out of the ordinary is being displayed. In certain implementations, to further warn and protect a user, a block icon can be placed near a "Disregard and Continue" option to further elevate user awareness, along with text indicating that this not a recommended option. Furthermore, actions that are not recommended, such as clicking through to a blocked page, can be hidden from "plain" site, and making the user go through, for example, a "more information" section (that can include a "disregard and continue option") that is collapsed and the user expands to see the choice. The goal is to reduce click throughs to bad pages/resources.

Figure 5:
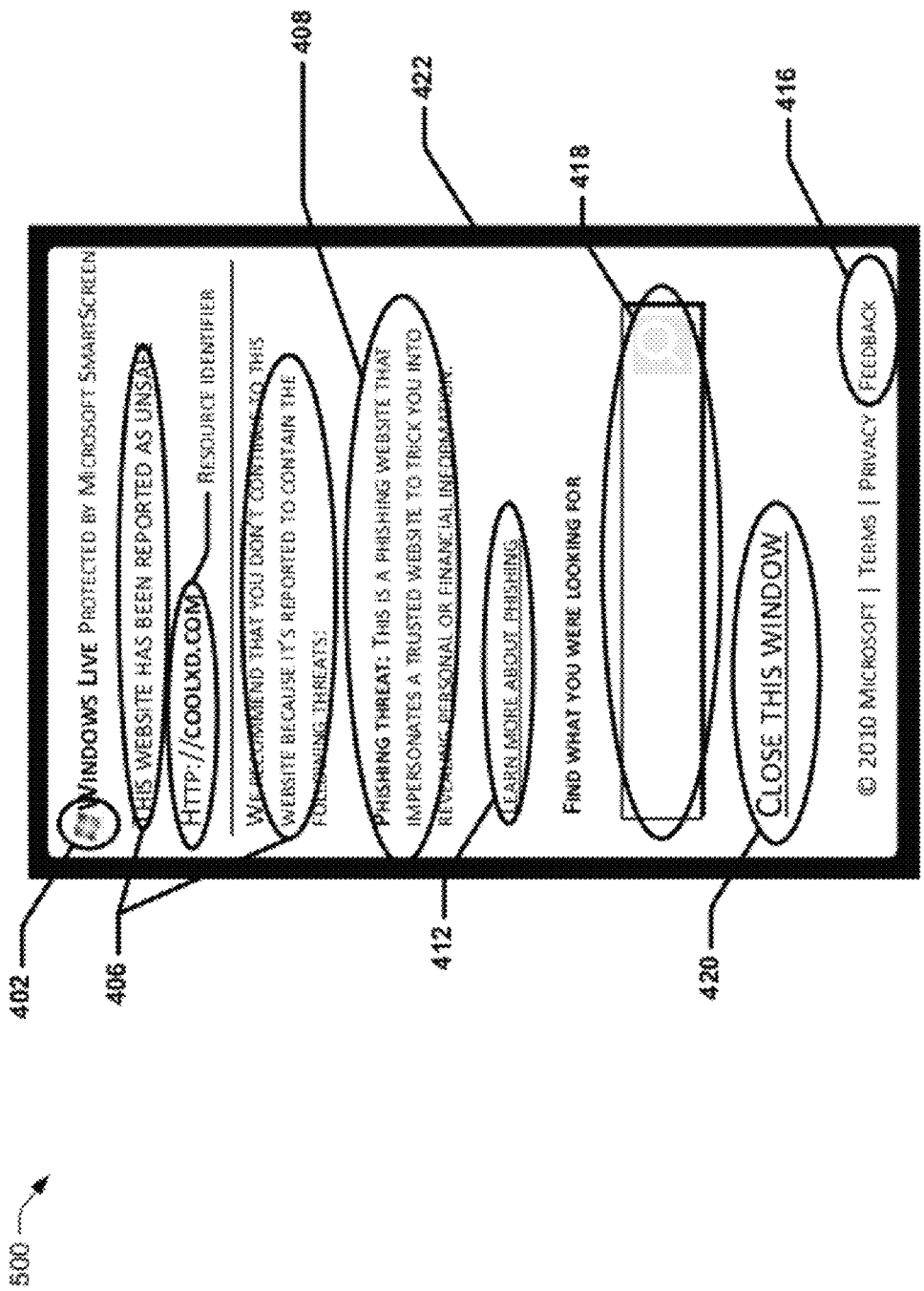
FIG. 5 depicts an example of a mobile device user interface of a block experience to a resource.

FIG. 5 is another example of a user interface 500 of a block experience to a resource. In this example, user interface 500 is an abbreviated (i.e., small screen) mobile device user interface. It is to be noted that a user experience of the different user experiences described herein, can be tailored to include multiple views or formats to support different screen sizes and devices. Furthermore, user experiences can be tailored based on the identity of the user and any meta-information known of the user; for example, age of the user.

Similar to user interface 400 described above, user interface 500 includes warnings and messages. The warning and messages in FIG. 5 provide the same or similar functions as the warnings and messages described in FIG. 4. The same or similar warnings and messages are labeled the same in FIGS. 4 and 5.

In this example, the user interface 500 includes brand 402; scary or warning message 406; contextual information 408; information links 412; user feedback 416; suggested actions 418; navigation actions 420; and atypical highlighting 422.

Figure 6:
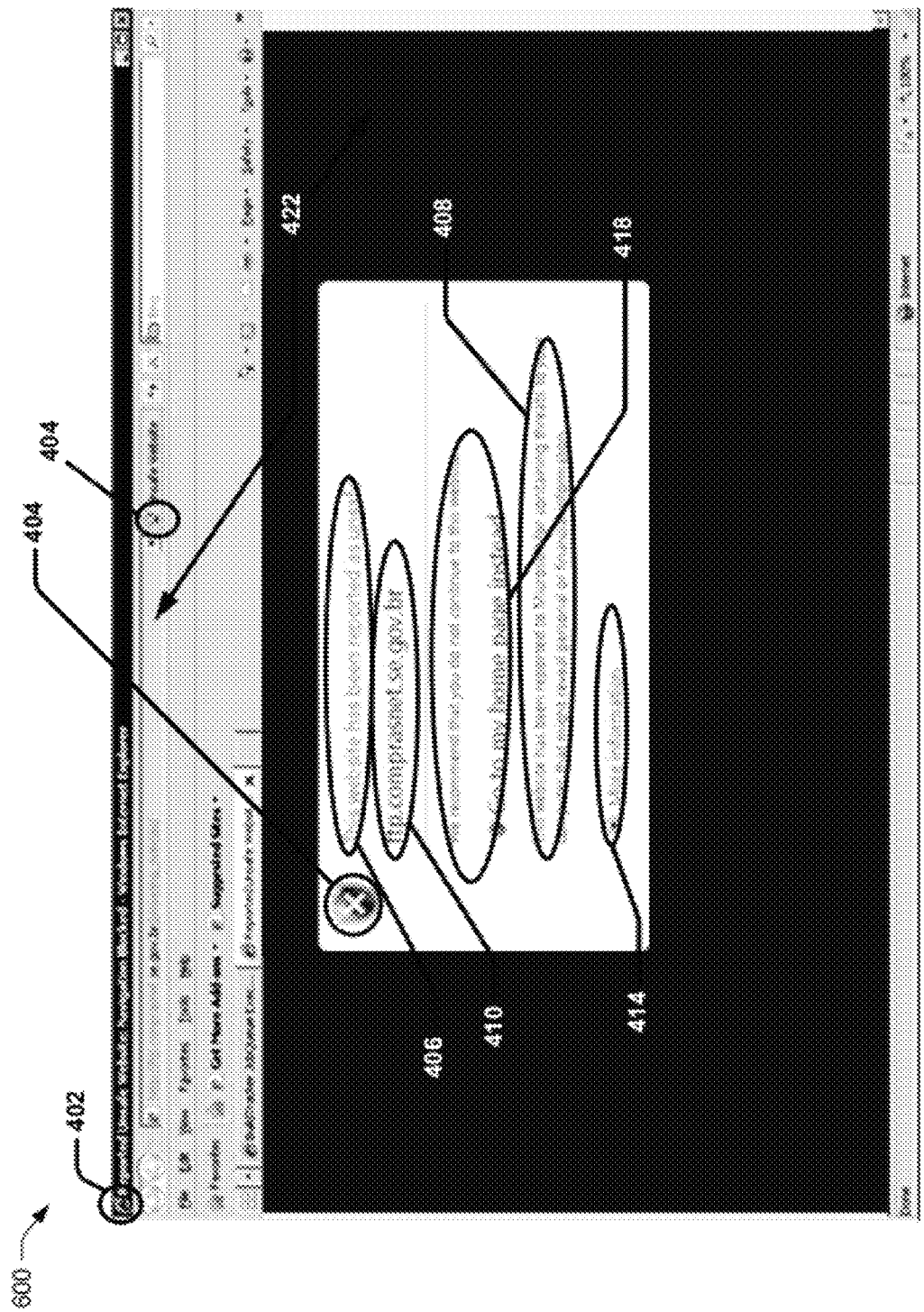
FIG. 6 depicts an example of a user interface of a block experience that provides menus of actionable links for additional information.

FIG. 6 is an example user interface 600 of a block experience that provides an actionable link for additional information to a user. In this example, contextual action 414 provides an actionable or click enabled icon "more information." The user us able to click on the "more information icon of contextual action 414, and the block experience takes the user to the user interface of FIG. 7.

Figure 7:
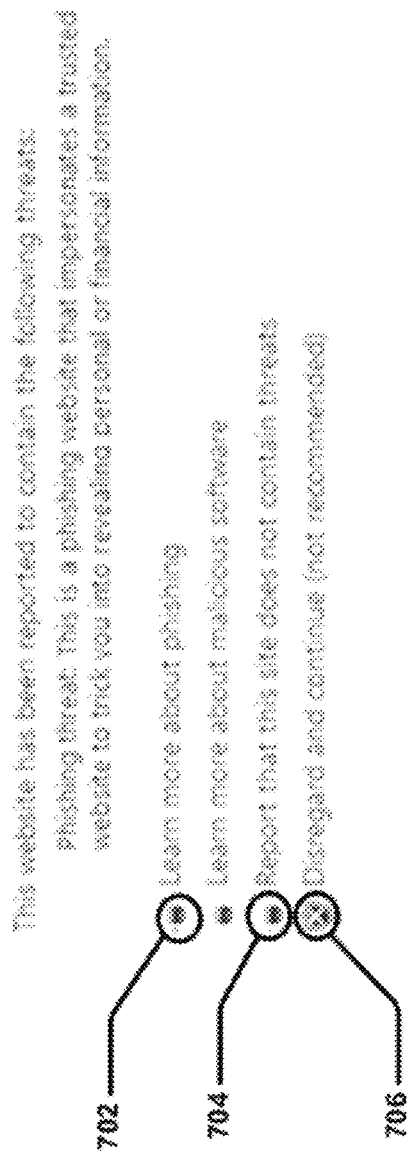
FIG. 7 depicts an example of a user interface of a block experience information link.

FIG. 7 is an example user interface 700 that expands contextual actions. In this particular example, the user interface 700 expands contextual action 414 of user interface 600, and provides additional information or options to the user.

In this example, user interface 700 provides more user links 702 for the user to "learn more about fishing." User feedback 704 is provided to allow the user to report that the site or resource "does not contain threats." An option 706 provides for the user to disregard and continue, although the user is advised that such an option 706 is not recommended.

Figure 8:
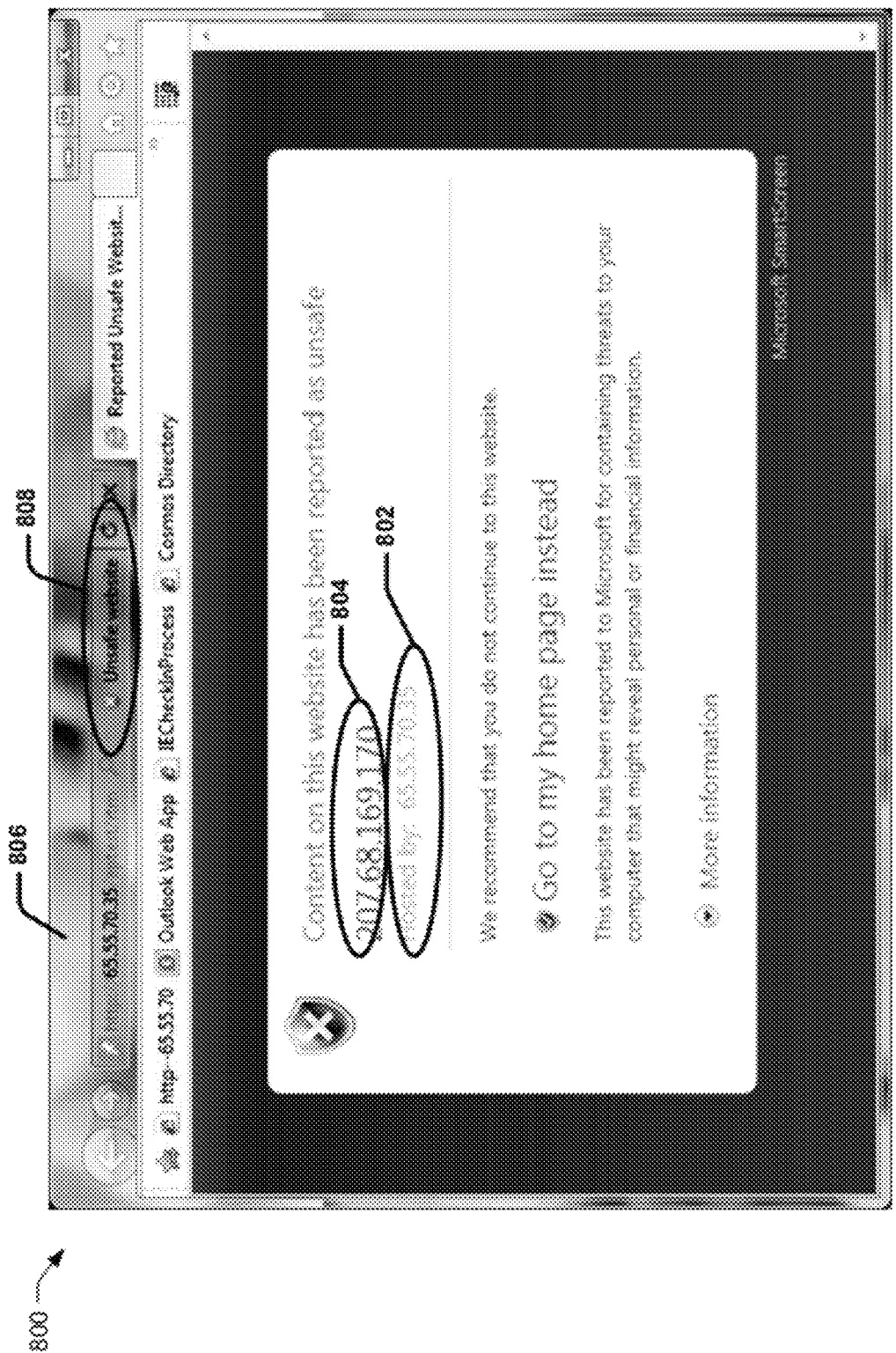
FIG. 8 depicts an example of a user interface of a block experience of a non-malicious page hosting a malicious frame.

FIG. 8 is an example user interface 800 of a block experience that provides a warning as to a malicious frame. In certain cases, a non-malicious page (i.e., known good resource) can host a malicious frame. User interface 800 can be a block experience, and displays for example, URL address of the non-malicious page 802, and the URL address of the malicious frame 804. The user is warned not to go to the website (resource). In certain implementations, an address bar 806 can be colored (e.g. red). In this example, a shield 808 (which can be colored as well) after the address with "unsafe website" shown. The shield 808 can be clicked and an overlay opened that states similar information as the block page, but with limited actions. For example, a limited action may be that the user can can only report a mistake. This can allow the user to see that the browser is telling them that the site is unsafe, which can give the user confidence that the block is legitimate, and not a trick or fake page.

Figure 9:
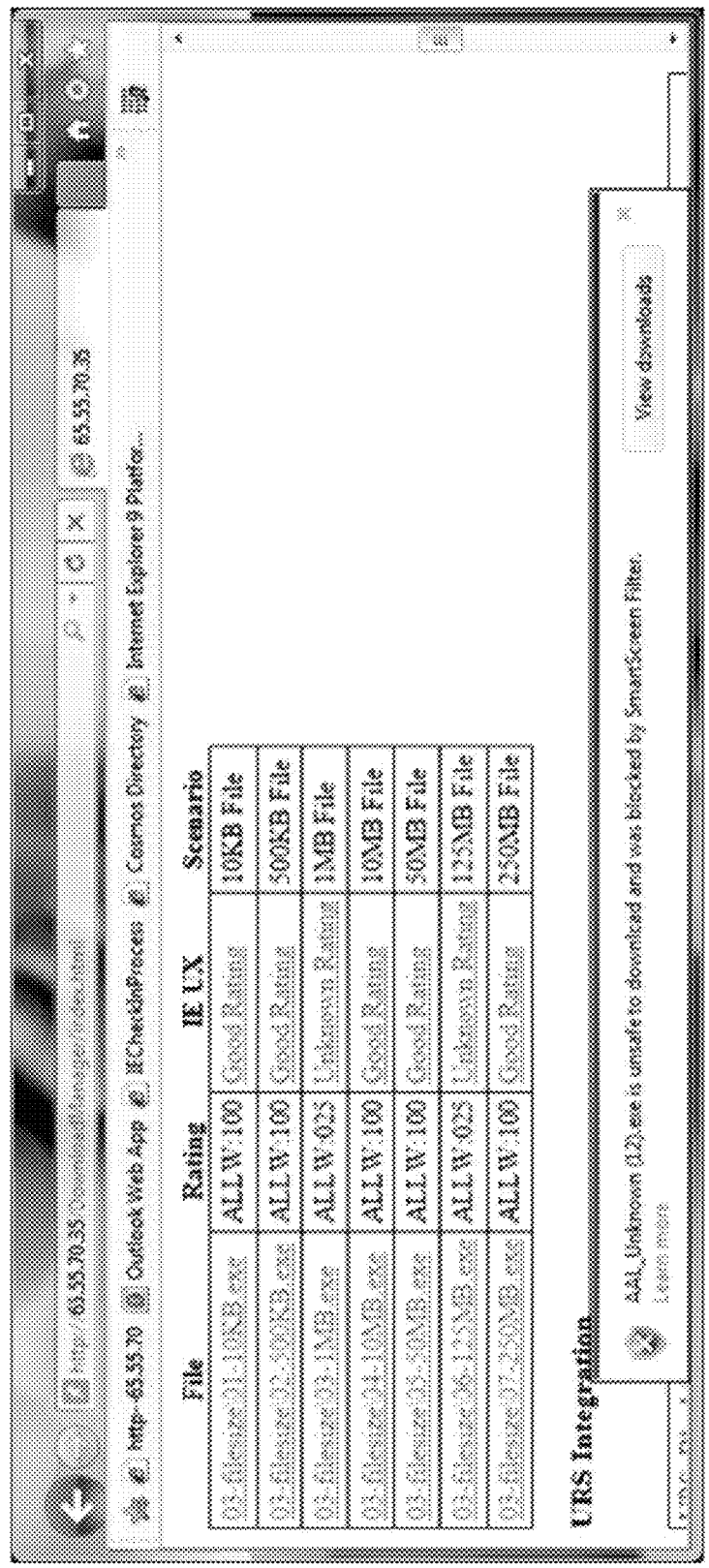
FIG. 9 depicts an example of a user interface of block experience associated with a download of content.

FIG. 9 is an example user interface 900 of a block experience that provides information as to downloaded files. In particular, user interface 900 identifies downloaded good and unknown rated files or resources. Unsafe files and resources can also be viewed at use interface 900.

Figure 10:
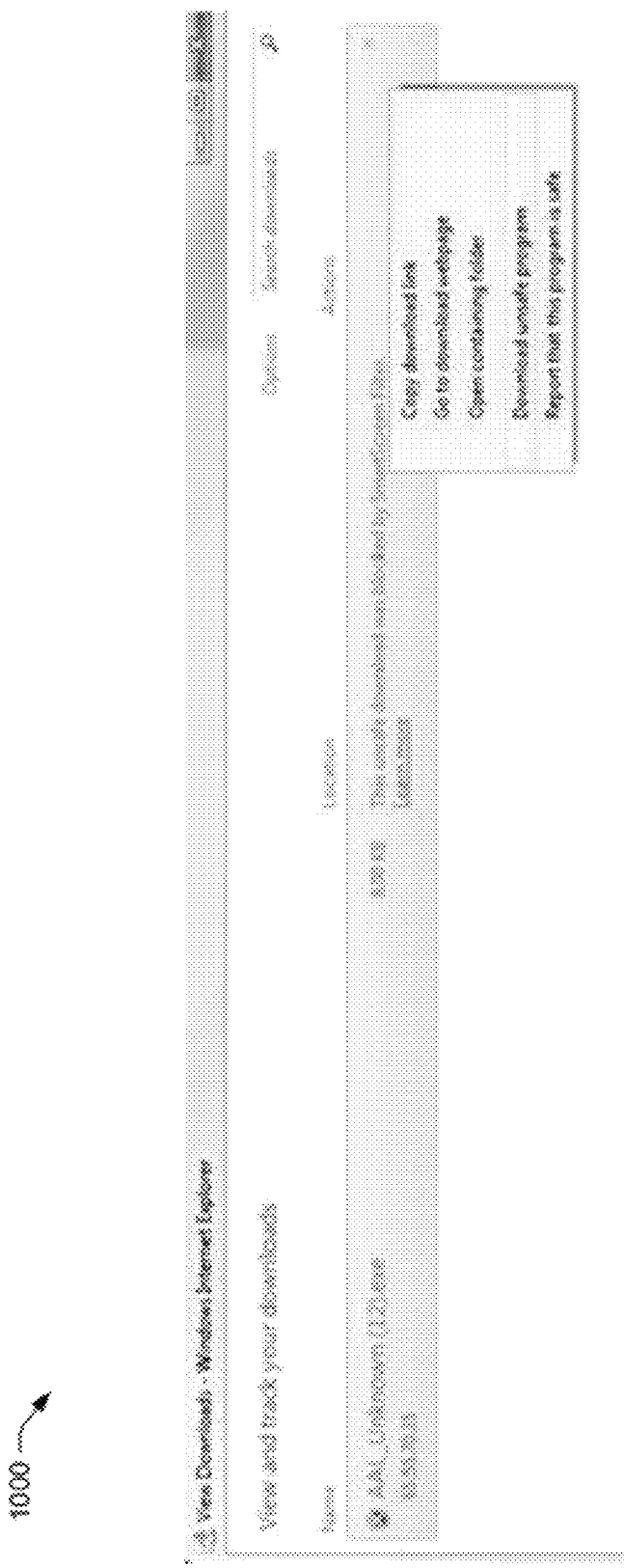

FIG. 10 is an example user interface 1000 of block experience for a download manager. The user interface 1000 particularly provides a click though override for a file or resource that has been identified as "unsafe." A context menu can be provided to override the block to download the file or resource.

Caution Experience

As discussed above, if the reputation lookup 108 determines that a particular resource (e.g., resource 104) is "suspicious" 204, the reputation determination leads to caution experience 214. The caution experience 214 includes one of various user interfaces, which include messages and/or warnings that are provided from the reputation lookup 108 to the computing device 106.

The caution experience 214 provided by reputation lookup 108, when reputation lookup 108 is aware of known resources which have threats that appear abusive; however, such resources cannot be explicitly block, because the resource does not conform to a policy that can be outright block as determined by the reputation lookup 108. For example, a resource may be a site that has hosted borderline or malicious content in the past, but an outright block recommendation cannot be made. In the caution experience 214 an explicit judgment is made by the reputation lookup 108, unlike the information experience 218. The caution experience 214 can also be referred to as a "warn" experience.

In general, similar user interfaces, such as described above in reference to FIGS. 4 to 10, implemented for block experience 210, can be implemented for caution experience 214. The difference between the user interfaces of the block experience 210 and caution experience 214 are the messages and warnings.

For example, a user interface of the caution experience 214 can include brand 402, identifying a company, product, or technology brand. User interfaces also can have consistent visual identifiers 404, as described above.

A user interface may present a caution message analogous to the scary or warning message 406 described above. An example is "this website may host malware."

Caution experience 214 user interfaces can include contextual information 408 indicating that something may be unsafe based on historical data. An example is "this website has hosted malware in the past."

Caution experience 214 user interfaces can include resource identifier(s) 410. As discussed above, the resource identifier(s) 410 can include URLs; however, such URLs or resource locations are not clickable or actionable, and are displayed for information purposes. The user is asked to explicitly navigate to the resource by clicking a navigation action such as "Continue." In the case of the caution experience 214, the full URL may be displayed with the domain highlighted.

Furthermore, the user interfaces of caution experience 214 can include contextual actions that inform the user, such as information links 412 and feedback 416. In addition, caution experience 214 user interfaces can include suggested actions 418 and navigation actions 420.

Information Experience

As discussed above, if the reputation lookup 108 determines that a particular resource (e.g., resource 104) is "unknown" 206, the reputation determination leads to information experience 218. The information experience 218 includes one of various user interfaces, which include messages and/or warnings that are provided from the reputation lookup 108 to the computing device 106.

The information experience 218 provides warnings as to resources that are not well known, have little reputation data, and/or accessed infrequently. For example, resource sites that are subject to information experience 218 include sites that are not on a "top traffic" list and sites that have not been confirmed as a "good" site. For the information experience 218, the reputation lookup 108 does not make a judgment call as to a resource (e.g., site); however, the reputation lookup 108 can warn a user to be more careful in accessing a resource or provide suggestions and reminders in proceeding.

User interfaces of information experience 218 are similarly to the user interfaces described above in FIGS. 4 to 10, implemented for block experience 210 and caution experience 214. Such user interfaces can include the same/similar warnings and icons. For example, the user interfaces of information experience 218 can include brand 402, consistent visual identifiers 404, contextual information 408, resource identifiers 410, contextual actions 414, and navigation options 420.

Furthermore, the user interfaces of the information experience 218 can include an information message similar to the scary or warning message 406 described above. The information message may be included in an intermediate page or user interface of the information experience 218.

Figure 11:
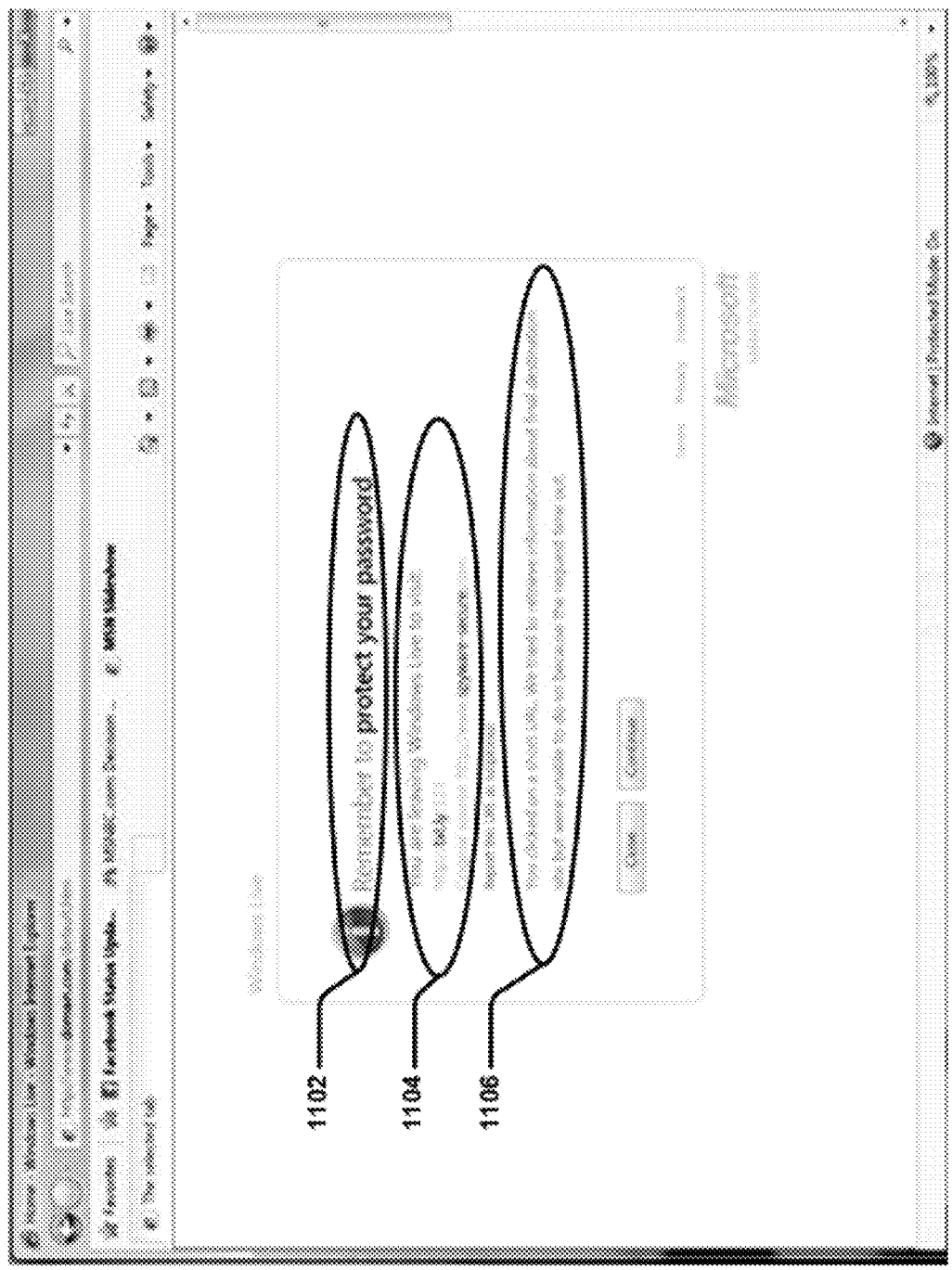
FIG. 11 depicts an example of a user interface of an information experience with example messages.

FIG. 11 is an example of a user interface 1100 of an information experience 218. In particular, user interface 1100 can be an intermediate page that is called up or initiated from another user interface or page of the information experience 218.

In this example, the user interface 1100 includes a message 1102 that reminds the user to "remember to protect your password"; a message 1104 that informs the user that the user is leaving the current site to go to another site; and a message 1106 informing the user of a requested act and what was performed.

Figure 12:
FIG. 12 depicts example of a user interface of a mobile device, of an information experience with example messages.

FIG. 12 is an example of a user interface 1200 for a mobile device that can be used for an information experience 218. The user interface 1200 can be an intermediate page that is called up or initiated from another user interface or page of the information experience 218.

In this example, the user interface 1200 includes a message 1202 that reminds the user to "remember to protect your password"; a message 1204 that informs the user that the user is leaving the current site to go to another site; and a message 1206 that allows the user to report the URL as suspicious.

Error Experience

As discussed above, if the reputation lookup 108 determines that an error 208 in accessing a particular resource (e.g., resource 104), the reputation determination leads to error experience 222. The error experience 222 includes one of various user interfaces, which include messages and/or warnings that are provided from the reputation lookup 108 to the computing device 106.

The error experience 222 informs the user that something went wrong. The error experience 222 can provide a teachable moment to users, and provide them a better understanding as to security on the Internet and other issues.

User interfaces of error experience 222 are similarly to the user interfaces described above in FIGS. 4 to 10, implemented for block experience 210, caution experience 214, and information experience 218. Such user interfaces can include the same/similar warnings and icons. For example, the user interfaces of error experience 222 can include brand 402, consistent visual identifiers 404, contextual information 408, resource identifiers 410, contextual actions 414 including information 412, suggested actions 418, and navigation options 420.

Furthermore, the user interfaces of the error experience 222 can include an error message, similar to the scary or warning message 406 and information messages 1102, 1104, 1106, 1202, 1204 and 1206 described above. The error message can be a textual message providing a description of the error.

Figure 13:
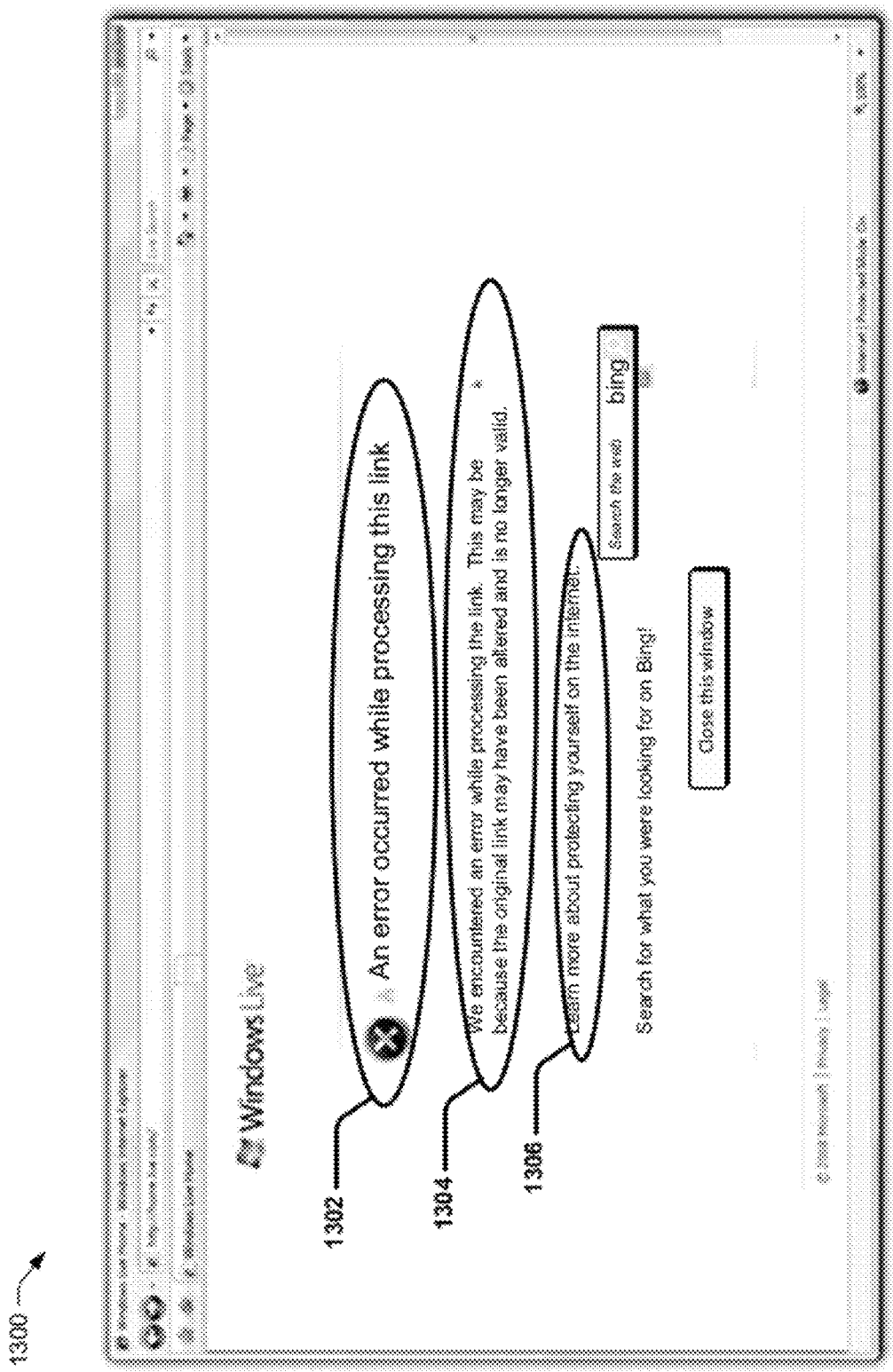
FIG. 13 depicts an example of a user interface of an error experience with example messages.

FIG. 13 is an example of a user interface 1300 of an error experience 222. In this example, the user interface 1300 includes a message 1302 that informs the user that "an error occurred while processing this link." Message 1304 further provides information as to why the error occurred. Message 1306 allows the user to learn more about protection on the Internet.

Figure 14:
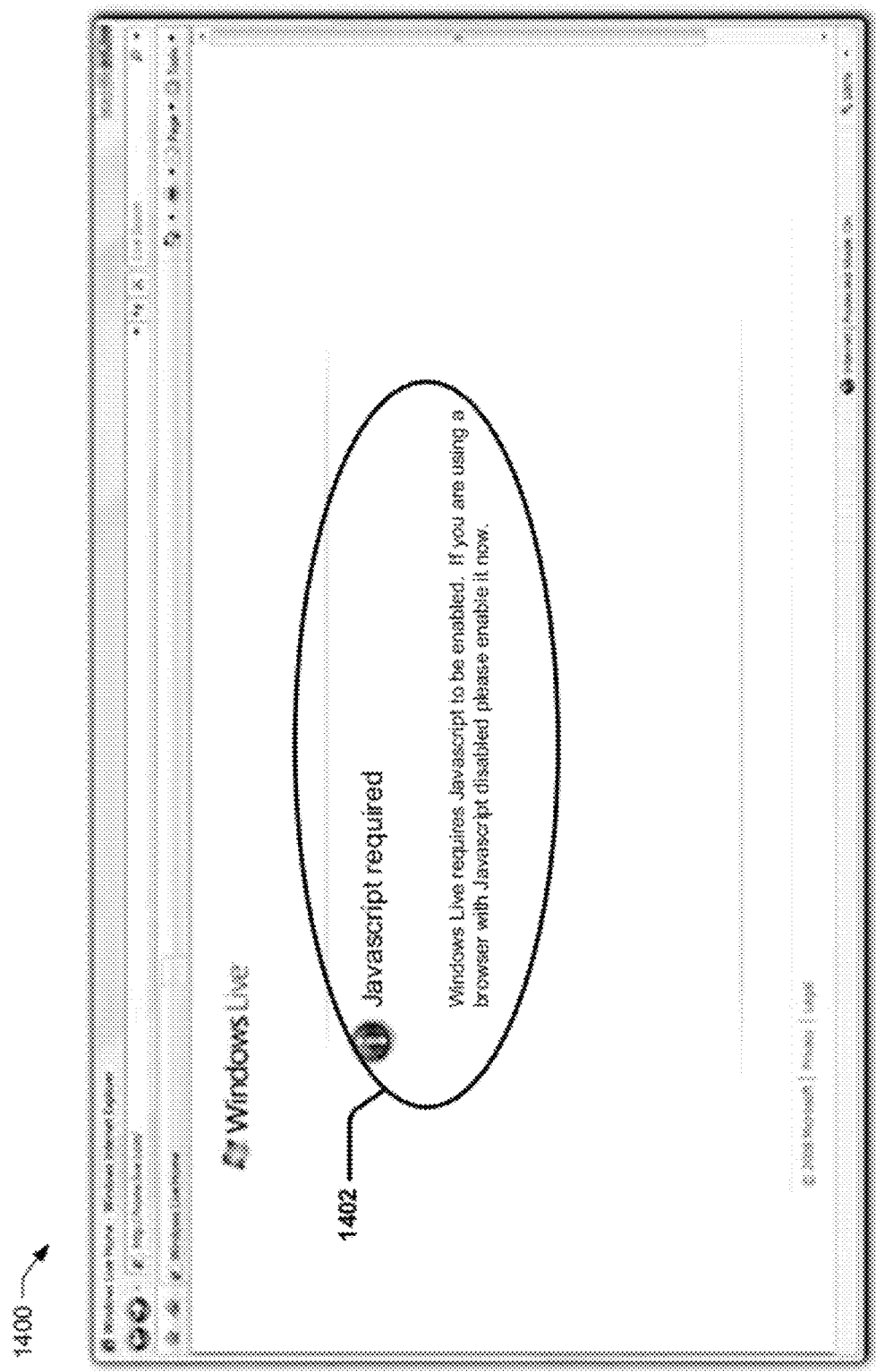
FIG. 14 depicts another example of a user interface of an error experience with example messages.

FIG. 14 is another example of a user interface 1400 of an error experience 222. In this example, the user interface 1400 includes a message 1402 that informs the user that "javascript is required", why "javascript is required", and what the user can do.

Protecting User Interfaces and Content

The user interfaces that are discussed above can be protected to prevent other parties from tampering with them. As discussed, reputation lookup service 108 provides the user experiences, and also provides the user interfaces associated with the user experiences. For example, the user interfaces may be encrypted, such as using a hash code or other encryption method on the user interfaces, before the user interfaces are sent from lookup service 108. This can prevent others from tampering with the user interfaces and content of the user interfaces. This further can prevent others from creating false experiences and presenting them to users. False experiences include associating resources with the wrong reputation. For example, associating a known bad resource with a reputation as known good.

Example System

Figure 15:
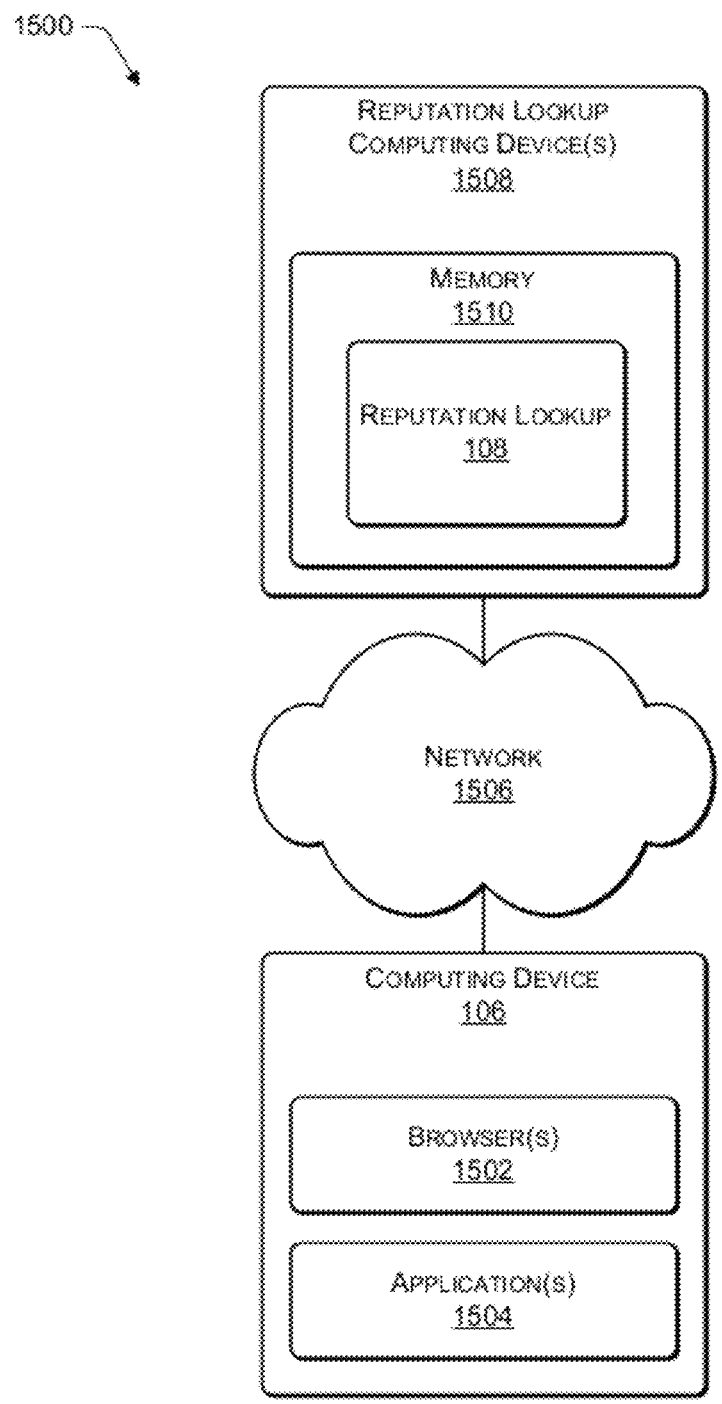
FIG. 15 is a block diagram of an example system for carrying out resource reputation lookup and user experiences to a computing device.

FIG. 15 illustrates an example of a system 1500 for carrying reputation lookup and providing experiences based on reputation of resources, according to some implementations herein. Computing device 106 includes one or more browser(s) 1502 and application(s) 1504 that are enabled to call up the reputation lookup 108.

To this end, the system 1500 includes one or more server or reputation lookup computing device(s) 1508 in communication with computing device 106 through a network 1506 or other communication link. It is to be understood that other computing devices may also be in communication with reputation lookup computing device(s) 1508.

In some implementations, reputation lookup computer device(s) 1508 exists as a part of a data center, server farm, or the like, and is able to serve as a component for providing a commercial service website. In certain cases, reputation lookup computer device(s) 1508 are part of a "cloud computing" architecture/system.

For example, in one implementation, network 1506 includes the world wide web implemented on the Internet, including numerous databases, servers, personal computers (PCs), workstations, terminals, mobile devices and other computing devices spread throughout the world and able to communicate with one another. Alternatively, in another possible implementation, the network 1506 can include just a single server computing device in communication with one or more client devices via a LAN (local area network) or a WAN (wide area network). Thus, the computing device 106 can be coupled to the reputation lookup computer device(s) 1508 in various combinations through a wired and/or wireless network 1506, including a LAN, WAN, or any other networking technology, using one or more protocols, for example, a transmission control protocol running over Internet protocol (TCP/IP), or other suitable protocols.

In some implementations, computing device 106 include personal computers, workstations, terminals, mobile computing devices, PDAs (personal digital assistants), cell phones, smart phones, laptops, tablet computing devices, or other computing devices having data processing capability. Furthermore, computing device 106 may include browser(s) 1502 and application(s) 1504 that are enabled to call up the reputation lookup 108 in a memory 1510 of reputation lookup computing device(s) 1508. Browser(s) 1502 may be any suitable type of web browser such as Internet Explorer®, Firefox®, Chrome®, Safari®, or other type of software configured to enable submission of a sketch-based query for a search as disclosed herein. Application(s) 1504 may be any type of application, and particularly applications that include actionable (e.g., click enable) hyperlinks to resources.

Furthermore, while an example system architecture is illustrated in FIG. 15, other suitable architectures may also be used, and that implementations herein are not limited to any particular architecture. For example, in some implementations, reputation lookup 108 may be located at different computing devices and/or services provided by reputation lookup 108 may be shared by different computing devices and/or services. Other variations will also be apparent to those of skill in the art in light of the disclosure herein.

Example Computing Device

Figure 16:
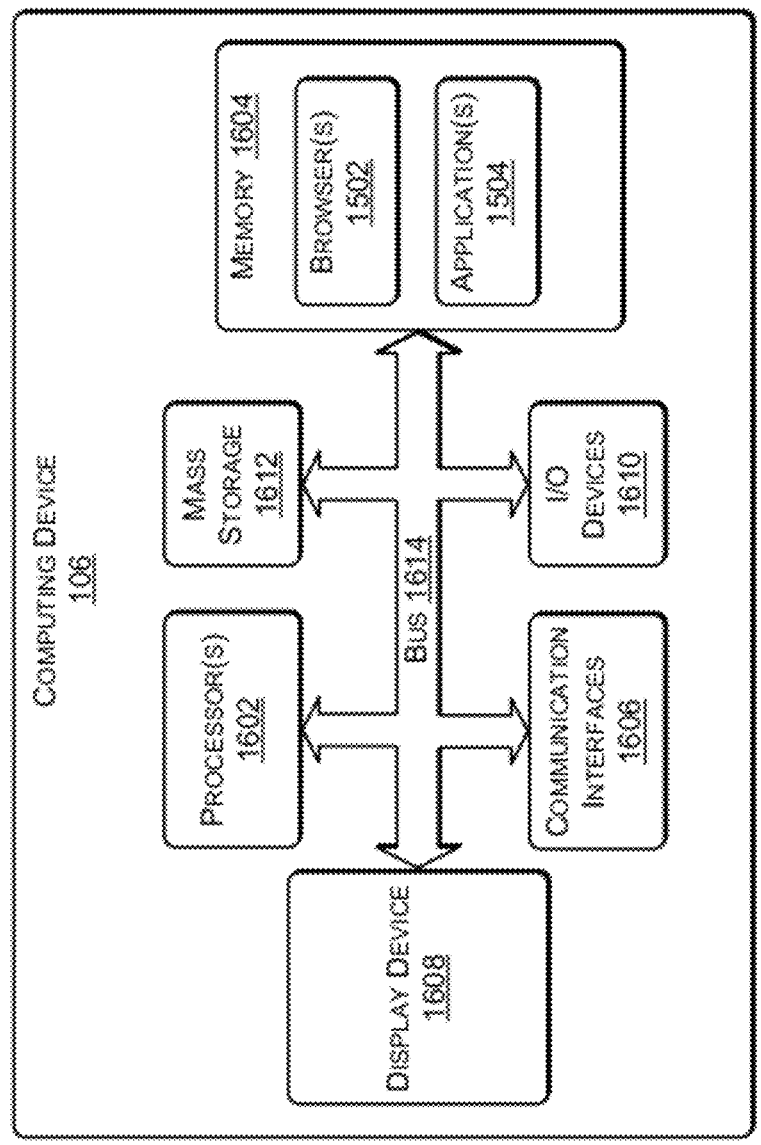
FIG. 16 is a block diagram of an example client computing device according to some implementations.

FIG. 16 illustrates an example configuration of a suitable computing system environment for computing device 106 according to some implementations herein. The computing device 106 may include at least one processor(s) 1602, a memory 1604, communication interfaces 1606, a display device 1608, input/output (I/O) devices 1610, and one or more mass storage devices 1612, all able to communicate through a system bus 1614 or other suitable connection.

The processor(s) 1602 may be a single processing unit or a number of processing units, all of which may include single or multiple computing units or multiple cores. The processor(s) 1602 can be implemented as one or more microprocessors, microcomputers, microcontrollers, digital signal processors, central processing units, state machines, logic circuitries, and/or any devices that manipulate signals based on operational instructions. Among other capabilities, the processor(s) 1602 can be configured to fetch and execute computer-readable instructions or processor-accessible instructions stored in the memory 1604, mass storage devices 1612, or other computer-readable storage media.

Memory 1604 and mass storage device 1612 are examples of computer-readable storage media for storing instructions which are executed by the processor 1602 to perform the various functions described above. For example, memory 1604 may generally include both volatile memory and nonvolatile memory (e.g., RAM, ROM, or the like). Further, mass storage device 1612 may generally include hard disk drives, solid-state drives, removable media, including external and removable drives, memory cards, Flash memory, floppy disks, optical disks (e.g., CD, DVD), storage arrays, storage area networks, network attached storage, or the like, or any combination thereof Both memory 1604 and mass storage device 1612 may be collectively referred to as memory or computer-readable storage media herein. Memory 1604 is capable of storing computer-readable, processor-executable program instructions as computer program code that can be executed on the processor 1602 as a particular machine configured for carrying out the operations and functions described in the implementations herein. Memory 1604 may include browser(s) 1502 and application(s) 1504 for enabling requesting a resource through a reputation lookup service, such as reputation lookup 108. For example, browser(s) 1502 may display one of the above described user interfaces as a part of a reputation lookup experience, as described above.

The computing device 106 can also include one or more communication interfaces 1606 for exchanging data with other devices, such as via a network, direct connection, or the like, as discussed above. The communication interfaces 1606 can facilitate communications within a wide variety of networks and protocol types, including wired networks (e.g., LAN, cable, etc.) and wireless networks (e.g., WLAN, cellular, satellite, etc.), the Internet and the like.

The display device 1608, such as a monitor, display, or touch screen, may be included in some implementations for displaying user interfaces and/or an input image to a user. I/O devices 1610 may include devices that receive various inputs from a user and provide various outputs to the user, such as a keyboard, remote controller, a mouse, a camera, audio devices, and so forth. In the case in which display device 1608 is a touch screen, the display device 1608 can act as input device for submitting queries, as well as an output device for displaying results.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or applications, and may be implemented in general purpose and special-purpose computing systems, or other devices having processing capability.

Additionally, the components, frameworks and processes herein can be employed in many different environments and situations. Generally, any of the functions described with reference to the figures can be implemented using software, hardware (e.g., fixed logic circuitry) or a combination of these implementations. The term "engine", "mechanism", or "component" as used herein generally represents software, hardware, or a combination of software and hardware that can be configured to implement prescribed functions. For instance, in the case of a software implementation, the term "engine", "mechanism", or "component" can represent program code (and/or declarative-type instructions) that performs specified tasks or operations when executed on a processing device or devices (e.g., CPUs or processors). The program code can be stored in one or more computer-readable memory devices or other computer-readable storage devices or media. Thus, the processes, components and modules described herein may be implemented by a computer program product.

Although illustrated in FIG. 15 as being stored in memory 1510 of reputation lookup service computing device(s) 1508, reputation lookup 108, or portions thereof, may be implemented using any form of computer-readable media that is accessible by lookup service computing device(s) 1508. Computer-readable media may include, for example, computer storage media and communications media. Computer storage media is configured to store data on a non-transitory tangible medium, while communications media is not.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Example Reputation-Based Lookup and User Experience Process

Figure 17:
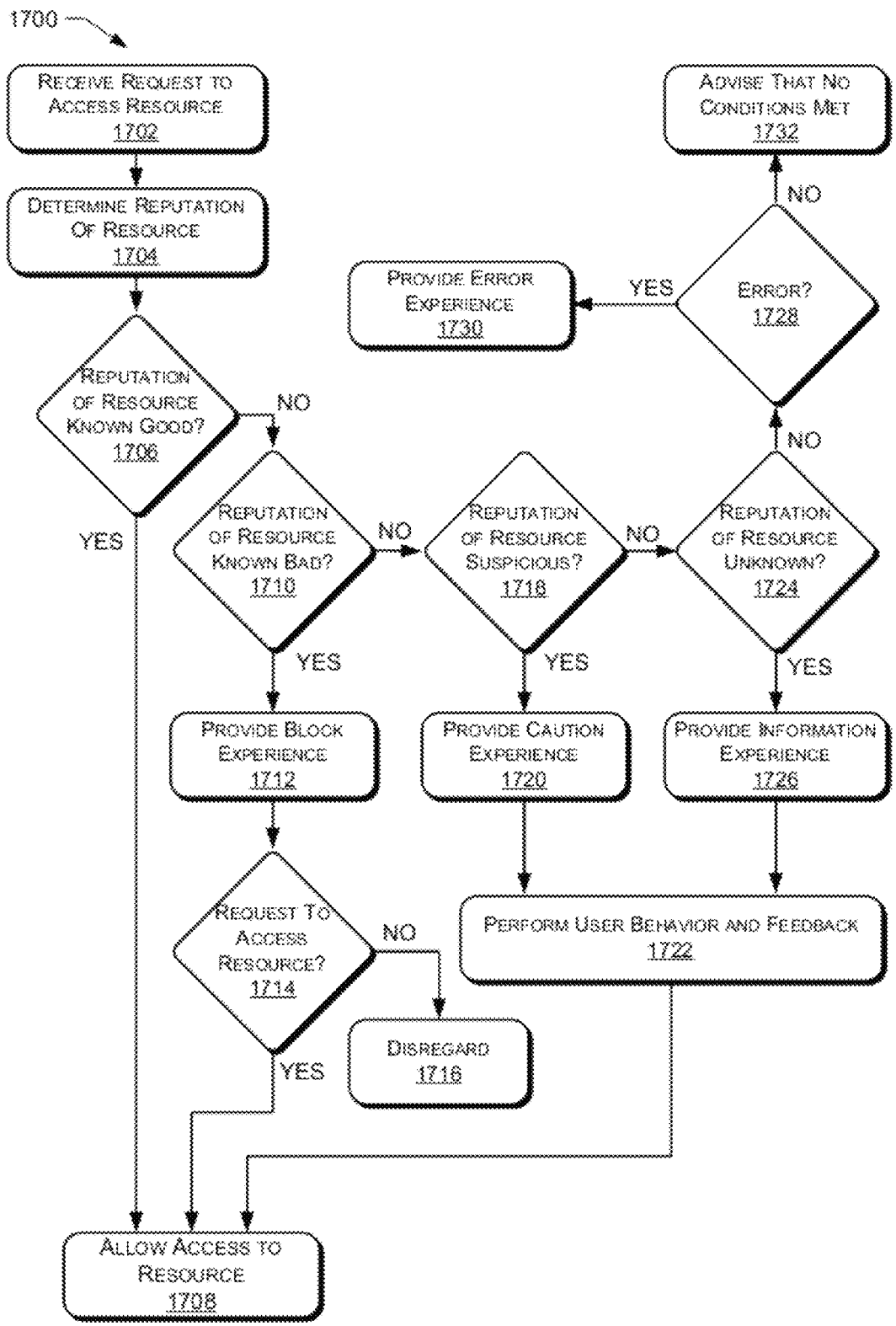
FIG. 17 is a flow diagram of an example process for resource reputation lookup and user experiences according to some implementations.

FIG. 17 depicts a flow diagram of an example of resource reputation and user experience process according to some implementations herein. In the flow diagram, the operations are summarized in individual blocks. The operations may be performed in hardware, or as processor-executable instructions (software or firmware) that may be executed by one or more processors. Further, the process 1700 may, but need not necessarily, be implemented using the framework 100 of FIGS. 1, 2, and 3, and the system of FIG. 15.

At block 1702, a request to access a resource from a computing device, such as described above, is received. The request can be made directly or indirectly by a user of the computing device.

At block 1704, a determination is made as to reputation of the resource. Reputation of a resource can be continually updated and refined. The reputation of the resource can be kept in various locations, and can be called up as needed.

If reputation of a resource is known as good, following the "YES" branch of block 1706, at block 1708 access is provided to the resource. The computing device is allowed to interact with the resource. Otherwise, if the resource is not known as good, following the "NO" branch of block 1706, block 1710 is performed.

If reputation of a resource is known as bad, following the "YES" branch of block 1710, at block 1712 a block experience is provided. The block experience can make use of the above described user interfaces related to a block experience, including top level and lower level user interfaces.

In certain cases, although the resource has a known bad reputation, access may still be desired. As discussed, one or more intermediate user interfaces may be presented before a click through or access to the resource is provided. If access to the request is requested, following the "YES" branch of block 1714, then block 1708 is performed. If there is no request to access the resource, following the "NO" branch of block 1714, at block 1716, access to the resource is disregarded.

If reputation of the resource is not known bad, following the "NO" branch of block 1710, block 1718 is performed. If reputation of a resource is suspicious, following the "YES" branch of block 1718, at block 1720 a caution experience is provided. The caution experience can make use of the above described user interfaces related to a caution experience, including top level and lower level user interfaces.

At block 1722, user behavior and feedback can be performed. As discussed above, this can include gathering data regarding user actions and history (i.e., use of) regarding a particular resource and modifying/adjusting the reputation of the particular resource. The caution experience provided at block 1720, allows access to the resource as an option. At block 1708 access to the resource can be performed.

If reputation of the resource is not suspicious, following the "NO" branch of block 1718, block 1724 is performed. If reputation of a resource is unknown, following the "YES" branch of block 1724, at block 1726 an information experience is provided. The information experience can make use of the above described user interfaces related to an information experience, including top level and lower level user interfaces.

At block 1722, user behavior and feedback can be performed. As discussed above, this can include gathering data regarding user actions and history (i.e., use of) regarding a particular resource and modifying/adjusting the reputation of the particular resource. The information experience provided at block 1726, allows access to the resource as an option. At block 1708 access to the resource can be performed.

If reputation of the resource is not unknown, following the "NO" branch of block 1724, block 1728 is performed. If an error is encountered related to the resource, following the "YES" branch of block 1728, at block 1730 an error experience is provided. The error experience can make use of the above described user interfaces related to an information experience, including top level and lower level user interfaces. If no error experience is encountered, following the "NO" branch of block 1728, some other condition or condition may exist not related to reputation lookup. An action advising that such conditions are not met can be provided at block 1732.

Accordingly, implementations herein provide for reputation-based resource lookup and providing a safe access user experience. The reputation-based resource lookup allows various user experiences to be presented to a user depending on the reputation of the resource which is desired to be accessed. Implementations can by provide graphical and visible messages that catch a user attention. Furthermore, options to access known or suspected unsafe resources, may be through succeeding user interfaces or pages.

Conclusion

Implementations herein provide a reputation-based resource lookup and user experiences based on the reputation of the resource. Further, some implementations enable protection from accessing known unsafe or suspicious resources. Additionally, some implementations provide user behavior and feedback as to resources.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method performed by one or more computing devices comprising:
    receiving a request to access a desired resource;
    accessing a reputation lookup database that includes a reputation record for at least the desired resource;
    determining that a reputation of the desired resource is known to be suspicious, based at least in part on the reputation record for the desired resource;
    determining whether to block the desired resource;
    providing a user interface at a computing device, wherein content displayed via the user interface is dependent upon the reputation of the desired resource, the determination of whether to block the desired resource, and meta-information associated with a user of the computing device;
    presenting an option for selecting access to the desired resource in response to determining that the desired resource has a suspicious reputation, the option comprising informational text having a predetermined text size and a predetermined text color;
    in response to determining that the desired resource is to be blocked, prompting additional user actions before access to the desired resource is allowed;
    determining user behavior data associated with the additional user actions, the user behavior data identifying a number of selections received via the user interface to access a single instance of the desired resource;
    in response to determining that the additional user actions have been performed, providing access to the desired resource via the user interface; and
    altering the predetermined text size or the predetermined text color based at least in part on the user behavior data.

2. The method of claim 1, further comprising:
    soliciting user feedback in response to determining that the desired resource is either suspicious and is not to be blocked or is unknown; and
    storing the user feedback.

3. The method of claim 2, further comprising, in response to a determination that the reputation of the desired resource is unknown, updating the reputation of the desired resource based at least in part on the user feedback that corresponds to the desired resource.

4. The method of claim 1, wherein, based at least partly on the reputation of the desired resource and the determination of whether the desired resource is to be blocked, the user interface provides for a visual display of a block experience, a caution experience, an information experience, or an error experience.

5. The method of claim 1, wherein the user interface provides information identifying a network location of the desired resource and supplemental content about the desired resource.

6. The method of claim 1, further comprising:
providing a warning at the user interface to indicate whether the desired resource is a known threat, prior to providing access to the desired resource; and
providing a selection at the user interface to allow the user to disregard a warning that the desired resource is a known threat, and access the desired resource anyway.

7. The method of claim 1, wherein the user interface displays a warning message, the warning message being an informational warning of an unknown nature of the desired resource in response to a determination that the desired resource has an unknown reputation, wherein;
the warning message indicates a malicious nature of the desired resource in response to determining that the desired resource is suspicious and is to be blocked; or
warning message indicates a suspicious nature of the desired resource in response to determining that the desired resource is suspicious and is not to be blocked.

8. The method of claim 1, further comprising accepting reputation feedback about the desired resource via the user interface.

9. The method of claim 1, wherein the meta-information comprises an age of the user.

10. The method of claim 1, wherein the user behavior data comprises at least one of an indication of an extent to which users disregard a block to the desired resource, an indication of an extent to which users select individual ones of the additional user actions, or an indication of selections users perform after the receiving the request to access a desired resource.

11. The method of claim 1, further comprising, presenting additional user information via the user interface based at least in part on the user behavior data, the additional user information corresponding to additional informational warnings associated with providing access to the desired resource.

12. The method of claim 1, further comprising, reclassifying the reputation record for the desired resource based at least in part on the user behavior data.

13. A method comprising:
accessing a reputation lookup database that includes a reputation record for a desired resource;
determining that a reputation of the desired resource is known to be suspicious, based at least in part on the reputation record for the desired resource;
presenting, via a user interface of a computing device, content associated with the desired resource, the content being based at least in part on the reputation of the desired resource;
presenting a first option for accessing the desired resource in response to determining that the reputation of the desired resource is suspicious, the first option being associated with text having a predetermined text size and a predetermined text color;
determining that the desired resource is to be blocked;
prompting additional user actions before access to the desired resource is allowed;
determining user behavior data associated with the additional user actions, the user behavior data identifying a number of selections received via the user interface to access a single instance of the desired resource;
based at least partly on a determination that the additional user actions have been performed, providing, via the user interface, access to the desired resource;
presenting a second option for providing feedback associated with the desired resource; and
altering at least one of the predetermined text size or the predetermined text color based at least in part on at least one of the user behavior data or the feedback.

14. The method of claim 13, wherein the reputation of the desired resource is associated with one of a following reputations: known good, suspicious, unknown, or error.

15. The method of claim 13, further comprising:
presenting a warning in response to determining the reputation of the desired resource, wherein the warning comprises at least one of contextual information that describes a nature of the warning, an indication of a location of the desired resource, or an indication of a location of supplemental content about the desired resource.

16. The method of claim 15, further comprising, adjusting the warning to include at least one of highlighted graphics or additional user information based at least in part on the user behavior data.

17. The method of claim 15, wherein the warning indicates that the desired resource is an unsafe desired resource, and presents an option to prevent access to the unsafe desired resource.

18. The method of claim 13, further comprising presenting an option for navigating to a different resource.

19. A computing device comprising:
one or more processors;
a memory storing executable instructions that, when executed by the one or more processors, cause the computing device to:
request access to a requested resource;
determine that a reputation of the requested resource is suspicious based at least in part on a reputation record for the requested resource;
present, via a user interface, an option to access the requested resource based at least partly on a determination that the requested resource has a suspicious reputation, the option including a prompt to perform additional user actions to access the requested resource, the option being associated with text having a predetermined text size and a predetermined text color;
determine user behavior data associated with the additional user actions, the user behavior data identifying a number of selections received via a user interface to access a single instance of the requested resource;
display, via the user interface, content associated with the requested resource, wherein the content is determined at least in part on the reputation of the requested resource, and wherein the user interface prompts the additional user actions to access the requested resource; and
alter at least one of the predetermined text size or the predetermined text color based at least in part on the user behavior data.

* * * * *